United States Patent [19]

Takahashi et al.

[11] Patent Number: 5,046,131
[45] Date of Patent: Sep. 3, 1991

[54] PORTABLE RADIO TRANSCEIVER APPARATUS

[75] Inventors: Akira Takahashi; Ryoichi Kaiwa; Naotomo Adachi, all of Yokohama, Japan

[73] Assignee: Matsushita Electric Industrial Co., Ltd., Osaka, Japan

[21] Appl. No.: 414,299

[22] Filed: Sep. 29, 1989

[51] Int. Cl.⁵ .............................................. H04B 1/38
[52] U.S. Cl. .................................... 455/90; 455/127; 455/343
[58] Field of Search .................... 455/89, 90, 127, 343, 455/347; 379/60, 61, 59; 320/2

[56] References Cited

U.S. PATENT DOCUMENTS

| | | | |
|---|---|---|---|
| 4,511,761 | 4/1985 | Yamazaki et al. | 455/127 |
| 4,893,348 | 1/1990 | Andoh | 455/343 |
| 4,903,325 | 2/1990 | Yoshitake | 455/127 |

Primary Examiner—Curtis Kuntz
Attorney, Agent, or Firm—Stevens, Davis, Miller & Mosher

[57] ABSTRACT

A radio transceiver apparatus is provided which includes (1) a radio transceiver carrying a removable battery pack which is charged when the radio transceiver is set on a holder including a charger, and (2) an adapter carrying an auxiliary battery pack, identical with the removable battery pack, which is charged when the adapter and auxiliary battery pack are set on the holder alternatively to the radio transceiver.

2 Claims, 2 Drawing Sheets

PORTABLE RADIO TRANSCEIVER APPARATUS

BACKGROUND OF THE INVENTION

The present invention relates to a portable radio transceiver apparatus, and more particularly, to a portable radio transceiver apparatus with a charging function.

PRIOR ART

This type of portable radio transceiver apparatus with a charging function has conventionally been provided with a holding section for holding a radio transceiver and a battery pack which are combined with each other in one unit. When the radio transceiver combined with the battery pack in one unit is set on the holding section, charging terminals provided on the radio transceiver or battery pack are made to come in contact with charging terminals provided on a stand so as to permit charging of the battery pack.

In FIG. 2 which shows an example of the conventional portable radio transceiver apparatus with a charging function, a reference numeral 14 denotes a radio transceiver body which has a fitting section 15 used for setting the body on a stand and has a removable battery pack 16 attached thereto. The battery pack 16 has charging terminals 17 through which it is supplied with charging current from the stand. These charging terminals 17 are designed to come in contact with charging terminals 14a of the radio transceiver body 14. Further, the terminals 14a are respectively connected to terminals 14c provided on the lower surface of the body through lead wires 14b.

A reference numeral 18 denotes a stand which has a holding section 19 adapted for setting and holding the fitting section 15 of the radio transceiver body 14 and has charging terminals 20 provided at positions where they are made to come in contact with the terminals 14c of the radio transceiver body 14 for the purpose of charging the battery pack 16 when the radio transceiver body 14 is set on the stand.

As the fitting section 15 of the radio transceiver body 14 having the battery pack 16 attached thereto is fitted in the holding section 19 of the stand 18, the charging terminals 14c provided on the radio transceiver body 14 are made to come in contact with the charging terminals 20 on the stand 18, thereby permitting charging of the battery pack 16.

As described above, even in the conventional portable radio transceiver apparatus with charging function, it is possible to charge the battery pack provided that the battery pack is attached to the radio transceiver.

SUMMARY OF THE INVENTION

However, in the conventional portable radio transceiver apparatus with charging function referred to above, the battery pack can be set on the stand only when it is combined with the radio transceiver in one unit. This gives rise to a problem that the battery pack cannot be charged alone without the radio transceiver.

The present invention is directed to solving the above problem, and an object of the present invention is to provide an excellent portable radio transceiver apparatus with charging function which is capable of charging a battery pack alone without increasing a charging circuit.

To this end, according to the present invention, there is provided a radio transceiver apparatus having a radio transceiver carrying a removable battery pack which is charged during the radio transceiver being set on a holder including a charger, and an adapter carrying an auxiliary batter pack identical with the removable battery pack which is charged when it is set on the holder, instead of the radio transceiver.

According to the present invention, the battery pack is alone attached to the holder portion of the adapter which is in turn set on the holding section of the stand, so that charging terminals of the battery pack and terminals of the adapter are connected to each other so as to allow charging terminals of the adapter to be engaged with charging terminals of the stand, thereby making it possible to charge the battery pack alone.

BRIEF DESCRIPTION OF THE DRAWINGS

The features and advantages of the present invention will be apparent from the following description in which an embodiment form of the present invention is described with reference to the accompanying drawings in which.

DESCRIPTION OF THE PREFERRED EMBODIMENT

Figure 1:
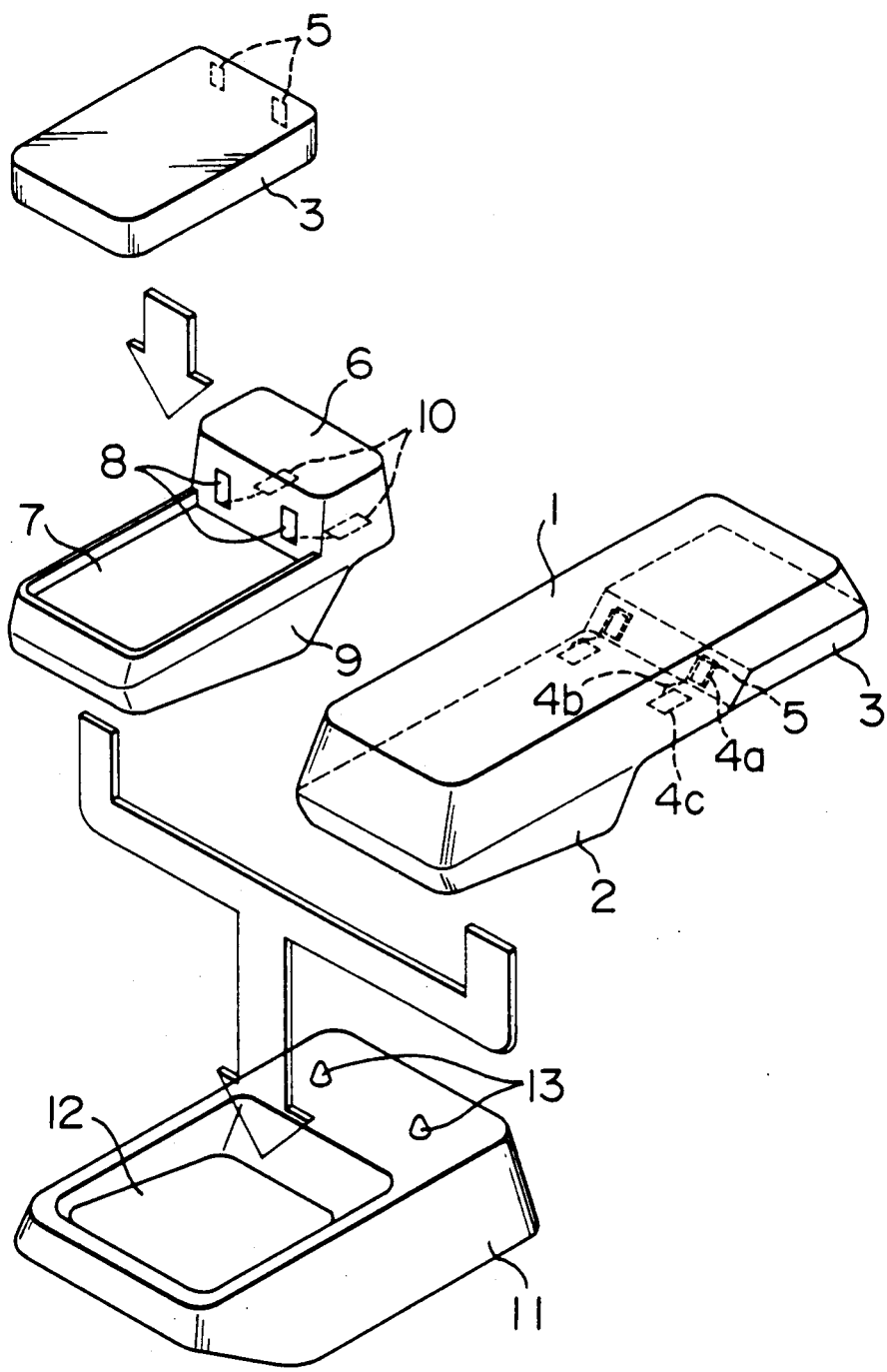
FIG. 1 is an exploded perspective view of a portable radio transceiver apparatus with charging function according to an embodiment of the present invention.
Figure 2:
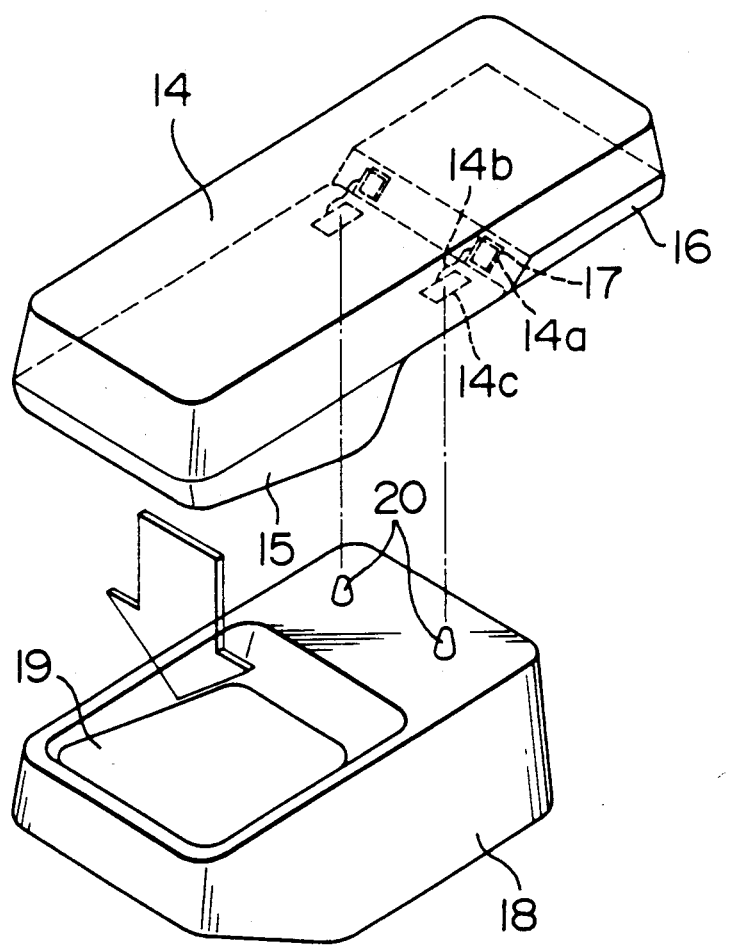
FIG. 2 is an exploded perspective view of a conventional portable radio transceiver apparatus with charging function.

In FIG. 1, a reference numeral 1 denotes a radio transceiver body which has a fitting section 2 used for setting the body on a stand and has a removable battery pack 3 attached thereto. The battery pack 3 has charging terminals 4 through which it is supplied with charging current from the stand and different charging terminals 5 through which electric energy is supplied to the body. A reference numeral 6 denotes an adapter which has a holder portion 7 in which the battery pack 3 is alone set and has contacts 8 which are made to come in contact with the charging terminals 5 of the battery pack 3 when the latter is set to the adapter. Further, the adapter 6 has a fitting section 9 which has the same configuration as the fitting section 2 of the radio transceiver body 1, and charging terminals 10 through which charging current is supplied from the stand. The contacts 8 and the charging terminals 10 are electrically connected to each other.

As described above, in the present embodiment, the configuration and the positional relationship of and between the fitting section 9 and the charging terminals 10 of the adapter 6 are in common with those of and between the fitting section 2 of the radio transceiver body 1 and the charging terminals 4c of the battery pack 3 when the battery pack 3 is attached to the body. In addition, a reference numeral 11 denotes a stand which has a holding section 12 adapted for setting and holding the radio transceiver body 1 and the adapter 6, and charging terminals 13 adapted to make contact with the charging terminals 4 of the battery pack 3 attached to the radio transceiver body 1 and with the charging terminals 10 of the adapter 6 so as to permit supply of charging current. In the embodiment described above, the battery pack 3 combined with the radio transceiver body 1 in one unit is set on the stand 11 so as to be charged in the same manner as the conventional apparatus described before. In such a case that it is intended to charge the battery pack 3 alone by making use of the stand 11, the battery pack 3 is first fitted in the holder portion 7 of the adapter 6. This operation places the charging terminals 5 of the battery pack 3 in contact with the contacts 8 of the adapter 6, so that they are electrically connected to each other. Further, the fitting section 9 of the adapter 6 is set to the holding section 12 of the stand 11 so that the charging terminals 10 of the adapter 6 are placed in contact with the charging terminals 13 of the stand 11. In this way the charging terminals 13 of the stand 11 and the charging terminals 5 of the battery pack 3 are electrically connected to each other, thus making it possible to charge the battery pack 3 alone. The battery pack 3 can be charged as well with the supply of charging current through the charging terminals 5.

As described above, according to the described embodiment, it becomes possible to charge the battery pack alone on the stand by making use of the adapter, that, has a fitting section and charging terminals which have a positional relationship therebetween and configuration in common with those of the radio transceiver body having the battery pack attached thereto.

Further, according to the described embodiment, the battery pack can be charged by use of only a single charging circuit in both cases, that is, charging the battery pack with the adapter and with the radio transceiver, thereby making it possible to provide a compact multifunction stand at a reduced cost.

Since the present invention has the construction described above, the battery pack can be charged on the stand not only when it is combined with the radio transceiver in one unit as in the conventional apparatus but also when it is alone with the use of the adapter.

In addition, since use of the adapter makes it possible to charge the battery pack with one of a single charging circuit in two conditions, that is, in the case that the battery pack is combined with the radio transceiver in one unit and in the case that it is alone, it becomes possible to provide the compact multifunction stand at reduced cost, thereby making it possible to cope with the various demands by users.

What is claimed is:

1. A portable radio transceiver apparatus comprising:
p1 a radio transceiver having a fitting section and having incorporated therein a removable battery pack;
an adapter having a fitting section, said adapter for carrying thereon an auxiliary battery pack identical to said removable battery pack;
a holder having a holding section for alternately receiving and holding said fitting section of said radio transceiver and said fitting section of said adapter;
a charge means disposed in said holder, for charging said battery pack in said radio transceiver when said radio transceiver is set on said holder and for charging said auxiliary battery when said adapter carrying said auxiliary battery pack is set on said holder alternatively to said radio transceiver.

2. A radio transceiver apparatus as set forth in claim 1, wherein each of said removable battery pack and said auxiliary battery pack has first contacts, and said charge means has second contacts for making contact with said first contacts through which charge is made when either of said adapter carrying said auxiliary battery pack and said radio transceiver carrying said removable battery pack is set on said holder.

* * * * *